July 25, 1972    J. PERINA    3,679,530

ATTACHMENT DEVICE OF HOOK AND LOOP FASTENERS

Filed June 8, 1970

INVENTOR.
JOSEPH PERINA

BY
Pennie, Edmonds, Morton, Taylor & Adams

ATTORNEYS

United States Patent Office 3,679,530
Patented July 25, 1972

3,679,530
ATTACHMENT DEVICE FOR HOOK AND LOOP FASTENERS
Joseph Perina, Huntington, N.Y., assignor to American Velcro, Inc., Manchester, N.H.
Filed June 8, 1970, Ser. No. 44,531
Int. Cl. B32f 7/08; A44f 21/00
U.S. Cl. 161—48        2 Claims

ABSTRACT OF THE DISCLOSURE

An attachment device is disclosed for removably attaching hooking elements of a separable fastener member to an object, said device comprising generally a support member from which the hooking elements project and a strap directed through selectively positioned spaced slots in the support member. The strap is adapted to be secured about said object to thereby hold the support member and associated hooking elements in place thereon.

BACKGROUND OF THE INVENTION

Separable fasteners such as the hook and loop fasteners described in U.S. Pats. 2,717,437 and 3,009,235 are widely used for the purpose of attaching one object to another. In general, fasteners of this type include separable members each having a pile-like surface of hooking elements. Upon being pressed together in face-to-face relationship, the hooking elements of the separable members releasably interengage one an other to hold the members together. In the above-mentioned U.S. patents, each separable member comprises a sheet of woven synthetic material having raised loop threads wherein the loops of one member are cut at their outer extremeties to form hook-type hooking elements while the loop threads of the other member remain uncut to form loop-type hooking elements. When these two members are pressed together in face-to-face relationship, there is a substantial engagement of the hook-type hooking elements with the loop-type hooking elements. A considerable effort must be applied to separate the members unless they are peeled apart in which case the members are separated quite easily.

The number of applications in which separable fasteners of the type described can be advantageously utilized is legion. One problem which characterizes the use of separable fasteners concerns attachment of the separable members themselves to adjacent structures. Adhesives are commonly used for this purpose. But adhesives are not suitable for some applications as for example, where the separable member is attached to a fabric material. For attachment to fabrics, the separable members are usually held in place by stitching. Conventional mechanical fasteners such as clips and staples, have also been used in the past for purposes of attaching separable members of the fastener but they too have presented problems in certain applications.

SUMMARY OF THE INVENTION

In accordance with the teachings of the present invention an attachement device for securing hooking elements of a separable fastener member to an object is provided; and, moreover, one which is particularly well suited for attaching said hooking elements to a nonplanar surface which is to be attached to a planar surface which is provided with complementary hooking elements. In construction, the attachment device includes a support member of semi-rigid material having a multiplicity of hooking elements projecting from one surface thereof. The support member has a first and second slot disposed in spaced relationship with respect to each other.

The attachment device further includes a flexible strap. The strap has a first and second portion extending respectively through the first and second slot in the support member with a third portion of the strap which interconnects the first and second portions extending along the surface of the support member opposite to the surface from which the hooking elements project. The strap may be wrapped about the object to which the hooking elements are to be attached and tightened thereabout to securely hold the support member and hooking elements in place.

DESCRIPTION OF PREFERRED EMBODIMENT

Figure 1:
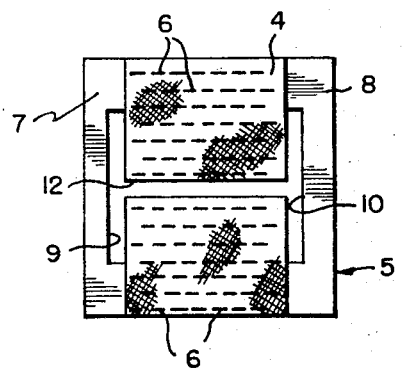
FIG. 1 is a top plan view of the support member of the attachment device of this invention.
Figure 2:
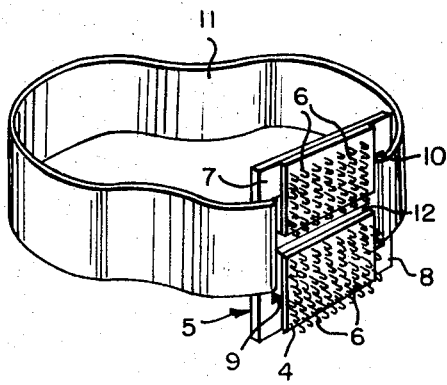
FIG. 2 is a perspective view of the attachment device of this invention.

As shown in FIG. 1, the attachment device of this invention includes a fastening member 4 which is secured to one surface of a flat support member 5 of semi-rigid material by any suitable means such as by adhesive bonding. The outwardly facing surface of the fastening member 4 is defined by a plurality of upwardly projecting hooking elements 6 of flexible resilient material. The support member 5 is semi-rigid in the sense that it is relatively stiff but nevertheless flexible and resilient enough to bend under an applied stress and return to its normal flat condition when stress is relieved. Suitable materials for support member 5 include any of the well-known plastics such as nylon.

The opposed marginal edges 7 and 8 of the support member 5 are left free of hooking elements and these marginal edges are provided with slots 9 and 10 respectively. The slots 9, 10 are disposed parallel to each other and each is positioned laterally clear of the hooking elements 6 with the distance separating slots 9, 10 being at least equal to the width of the portion of support member 5 which is covered with hooking elements 6.

A strap in the form of an endless elastic band 11 extends across marginal edge 7 through slot 9 along the surface of the support member opposite to the surface from which the hooking elements project and then through slot 10 and across marginal edge 8 as shown.

The support member 5 is provided with access means leading into slots 9 and 10 for facilitating attachment and detachment of the endless band 11 to the support member 5. This means comprises a slit 12 extending perpendicularly between slots 9 and 10. Attachment of the band 11 is easily accomplished simply by folding over a portion thereof longitudinally upon itself and forcing it through slit 12 from the side of support member 5 from which the hooking elements project. Once in this position the band is worked gently out of the slot 12 until it extends through slots 9 and 10 as described above. Detachment of the band 11 from the support member 5 is accomplished simply by reversing the attachment procedure.

Figure 3:
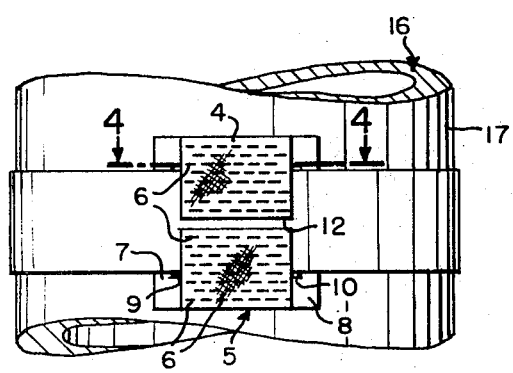
FIG. 3 is an elevation view of the attachment device shown in FIG. 2 secured about a cylindrical object.

The attachment device of the present invention is particularly well suited for attaching an object having a nonplanar surface to another object having a flat planar surface or for attaching two objects together both of which have a non-planar surface. In the application shown in FIGS. 3 and 4, the attachment device is used to attach a cylinder 16 to a flat surface 18. For this purpose, the attachment device is attached to the outer surface 17 of cylinder 16 by stretching the elastic band 11 thereabout.

Fastening member 4' having a plurality of upstanding complementary hooking elements 6' which are adapted to interengage hooking elements 6 is suitably secured to flat surface 18 as shown.

In the construction shown in the drawings the hooking elements 6 comprise tiny upstanding hooks while the complementary hooking elements 6' comprise tiny upstanding loops. It will be recognized that hooking elements 6 and complementary hooking elements 6' may be interchanged so that the hooking elements 6 projecting from support member 5 comprise loops while complementary hooking elements 6' mounted on flat surface 18 comprise hooks. In fact, it is contemplated the hooking elements on support member 5 and flat surface 18 may be comprised of both hook-type hooking elements and loop-type hooking elements.

To attach the cylinder 16 to the flat surface 18, the hooking elements 6 are pressed in face-to-face relationship with complementary hooking elements 6'. This will result in interengagement of a large number of hook-type hooking elements 6 and loop-type hooking elements 6' thereby firmly securing cylinder 16 to flat surface 18. Separation can be quite readily effected by peeling the interengaged hooking elements apart. Due to its flexibility, support member 5 is readily bendable to permit it to be peeled away from flat surface 18.

The strength of attachment between cylinder 16 and flat surface 18 is directly proportional to the number of hooking elements 6 which become engaged by complementary hooking elements 6'. Maximum engagement, it will be recognized, is achieved when all of hooking elements 6 are engaged by complementary hooking elements 6'; and the chances of this happening are substantially increased if the hooking elements 6 are held in the same flat condition as hooking elements 6'.

Figure 4:
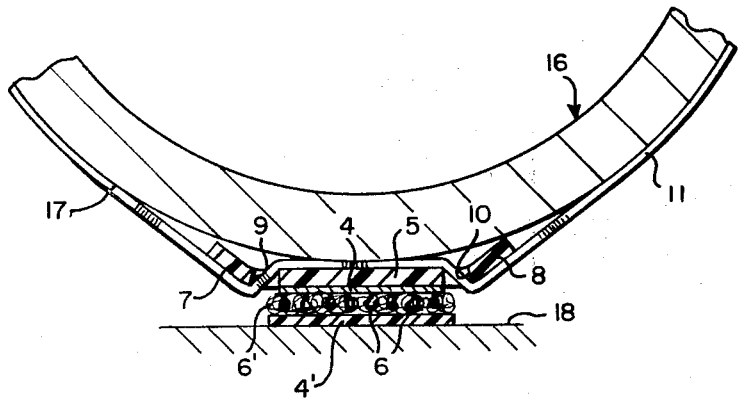
FIG. 4 is a cross-sectional view taken along the lines 4—4 of FIG. 3.

With a support member constructed according to this invention, the hooking elements projecting therefrom are maintained in a substantially flat condition despite tension in strap 11 which tends to bend the support member into conformity with the curvature of the outer surface of cylinder 16. This is due to the position of the slots 9 and 10 with respect to the hooking elements 6. As shown in FIG. 4, slots 9 and 10 act to relieve stress created by strap tension in the portion of the support member between the slots and confine such stress to the marginal edges 7 and 8 which are free of hooking elements. Thus only the marginal edges 7 and 8 of support member 5 are bent by strap tension while the central portion of the support member containing hooking elements 6 remains in a substantially flat planar condition. Consequently, maximum possible interengagement between hooking elements 6 and 6' is effected thus, in turn, maximizing the strength of attachment between cylinder 16 and flat surface 18.

With the attachment device of this invention, the hooking elements of a separable fastener member may be quickly and conveniently secured to the desired object. Moreover, the hooking elements may be easily removed from one object and secured to another. Thus the attachment device of this invention may be used to selectively attach a plurality of different objects to other objects. In addition to the above advantages, the attachment device of this invention is simple in construction and inexpensive to produce all of which enhances its overall utility. While the advantages provided by this attachment device are fully utilized when at least one of the two objects to be attached has a non-planar surface, many of these advantages are obtained even in cases were neither of the objects has a non-planar surface.

The fastening members 4 and 4' with associated upstanding hook-type or loop-type hooking elements illustrated in the drawings of the preferred embodiment of this invention may consist of the woven hook pile or loop pile material described in U.S. Pats. 2,717,437 and 3,009,235 or of the knitted loop pile or hook pile material described in commonly assigned copending U.S. patent application Ser. No. 659,669, filed Aug. 10, 1967, now U.S. Pat. 3,530,687. Alternatively, these hook and loop type hooking elements may consist of the molded plastic hook pile or loop pile material described in commonly assigned copending U.S. patent application Ser. No. 824,597, filed May 14, 1969. Also, in the event molded plastic material is used, the hooking elements may be molded integrally with the support member.

I claim:

1. An attachment device containing complementary hooking elements of the type having a plurality of at least one upstanding hook and loop type members characterized by the property that said complementary hooking elements will engage with another member having complementary hooking elements when pressed in face-to-face relation, said attachment device comprising:
    (a) a support member having a plurality of said hooking elements projecting from one surface thereof;
    (b) an elastic band connected to said support member; and
    (c) means for connecting said band to said support member which comprises a first and second slot in the support member arranged in spaced relationship with respect to each other, said band having a first and second portion extending respectively through the first and second slot with a third portion of the band interconnecting the first and second portions thereof and extending along the surface of the support member opposite to the surface from which the hooking elements project, such that said support member can be attached to any three dimensional objects having a variety of sizes and shapes due to the elasticity of said elastic band.

2. The attachment device according to claim 1 wherein said elastic band is in endless form and said support member further comprises a slit extending perpendicularly between the first and second slot with each end of the slit leading into one of said slots, thereby providing access means leading into said slots for facilitating attachment and detachment of the endless elastic band to said support member.

References Cited
UNITED STATES PATENTS

| | | | |
|---|---|---|---|
| 687,973 | 12/1901 | Bohn | 24—73 MC |
| 1,526,867 | 2/1925 | Peterson | 24—3 M |
| 3,485,529 | 12/1969 | Marling | 24—204 X |
| 3,387,341 | 6/1968 | Mates et al. | 24—10 R |
| 3,128,514 | 4/1964 | Parker et al. | 24—204 X |
| 3,321,068 | 5/1967 | Beach | 24—204 UX |

FOREIGN PATENTS

| | | | |
|---|---|---|---|
| 1,103,471 | 2/1968 | Great Britain | 24—204 |

PHILIP DIER, Primary Examiner

U.S. Cl. X.R.

24—73, 204; 161—53, 109